(12) United States Patent
Shibazaki

(10) Patent No.: US 8,023,081 B2
(45) Date of Patent: Sep. 20, 2011

(54) LIQUID CRYSTAL DISPLAY DEVICE

(75) Inventor: Minoru Shibazaki, Tokyo (JP)

(73) Assignee: TPO Hong Kong Holding Limited, Shatin (HK)

( * ) Notice: Subject to any disclaimer, the term of this patent is extended or adjusted under 35 U.S.C. 154(b) by 880 days.

(21) Appl. No.: 11/921,805

(22) PCT Filed: Jun. 8, 2006

(86) PCT No.: PCT/JP2006/311512
§ 371 (c)(1),
(2), (4) Date: Dec. 7, 2007

(87) PCT Pub. No.: WO2006/132316
PCT Pub. Date: Dec. 14, 2006

(65) Prior Publication Data
US 2009/0147194 A1    Jun. 11, 2009

(30) Foreign Application Priority Data
Jun. 10, 2005   (JP) .................................. 2005-171542

(51) Int. Cl.
*G02F 1/1335* (2006.01)
(52) U.S. Cl. ....................................... 349/119; 349/117
(58) Field of Classification Search .................. None
See application file for complete search history.

(56) References Cited

U.S. PATENT DOCUMENTS

| | | | |
|---|---|---|---|
| 5,853,240 A * | 12/1998 | Tanaka et al. | 353/20 |
| 6,295,109 B1 | 9/2001 | Kubo et al. | |
| 6,341,002 B1 * | 1/2002 | Shimizu et al. | 349/119 |
| 2001/0048497 A1 * | 12/2001 | Miyachi et al. | 349/117 |
| 2001/0055082 A1 | 12/2001 | Kubo et al. | |
| 2005/0024563 A1 | 2/2005 | Jang et al. | |
| 2005/0264720 A1 * | 12/2005 | Itou et al. | 349/99 |

FOREIGN PATENT DOCUMENTS

| | | |
|---|---|---|
| JP | 2000-035570 | 2/2000 |
| JP | 2002-350853 | 12/2002 |
| JP | 2004-157453 | 6/2004 |
| JP | 2005-055902 | 3/2005 |
| JP | 2006-011414 | 1/2006 |

OTHER PUBLICATIONS

PCT International Search Report of Counterpart PCT Application No. PCT/JP2006/311512, Jul. 24, 2006.

* cited by examiner

*Primary Examiner* — Lucy P Chien
(74) *Attorney, Agent, or Firm* — Liu & Liu

(57) ABSTRACT

A liquid crystal display device of a simplified structure and a widened viewing angle are provided. The liquid crystal display device having a stacked structure with its component plates and layers laid one over another in the following top-down order, comprises a first polarizing plate of α in optic-axial angle, a first λ/2 retardation plate of β in the optic-axial angle, a first λ/4 retardation plate of γ in the optic-axial angle, a liquid crystal layer located as an interlayer between two of substrates and having its opposite major surfaces oriented in vertical directions, a second λ/4 retardation plate disposed in phase or in parallel with the first λ/4 retardation plate (i.e., the optic-axial angle of γ), a second λ/2 retardation plate of (2γ−β) in the optic-axial angle, and a second polarizing plate of (π/2−α+2γ) in the optic-axial angle.

6 Claims, 6 Drawing Sheets

LIQUID CRYSTAL DISPLAY DEVICE

BACKGROUND OF THE INVENTION

1. Field of Invention

The present invention relates to a liquid crystal display device, and more particularly, it relates to a liquid crystal display device with a wide viewing angle.

2. Related Art

The liquid crystal display device adjusts liquid crystal orientations to control a transmission of light beam, and this disturbs the device from providing a sufficient range of a viewing angle to obtain a satisfactory display.

For example, Patent Document 1 listed below discloses a mode suitable to obtain a sufficient viewing angle. In this mode, called "Vertical Alignment (VA)" mode, molecules of liquid crystal align themselves to make vertical chains without applying voltage, and they align in horizontal chains when voltage is applied. The cited document teaches that a varied direction of observing alters a retardation (optical length) to equally vary a resultantly displayed image depending upon a visual direction of the viewer. When dependency of the retardation upon the viewing angle increases, allowable viewing angle concomitant with a deteriorated visibility of a display panel is accordingly degraded.

In order to overcome the aforementioned issue of interest on the allowable viewing angle, Patent Document 1 proposes a stacked structure. In the stacked structure, some optical components such as polarizing plates and wavelength plates underlie and overlie a liquid crystal layer. Specifically, in the cited document, a transmissive liquid crystal display device is described in conjunction with a schematic sectional view of FIG. 6. FIG. 6 depicts an exemplary stacked arrangement with a polarizing plate (on the observer side) 1, a $\lambda/2$ retardation plate 2, a $\lambda/4$ retardation plate 3, a liquid crystal layer 4, a $\lambda/4$ retardation plate 5, a $\lambda/2$ retardation plate 6, and a polarizing plate (on the backlight side) 7. The liquid crystal layer 4 has orientating layers 4a and 4b on its opposed major surfaces. The polarizing plate 7 is laid one over another in the top-down order. In such an arrangement, two of the $\lambda/2$ retardation plates, being vertically symmetrical about the liquid crystal layer, have respective retardation axes which are shifted 90 degrees from each other and out of phase. Another pair of the $\lambda/4$ retardation plates are disposed similarly.

LIST OF THE CITED DOCUMENTS

Patent Document 1: Japanese Patent Preliminary Publication No. 2002-350853.

In this configuration of the aforementioned manner, the retardation plates of the same wavelength respectively have retardation axes, which are shifted and orthogonal to each other. Thus, the contrast of the display is good when viewing from a face-up position right in front of the display panel. When viewing slightly apart from this frontal face-up position results in a viewing angle to the display plane, however, the display is varied in phase, and the allowable viewing angle is not so good.

In a case of widely applying the liquid crystal display device to a mobile phone, especially in Europe, black color is popular for the background of the display. In order to blacken the black background more, as shown in FIG. 6, compensating films 8 and 9 should be provided between the liquid crystal layer 4 and the retardation plates 3, 5. Because of the requirement of the compensating films, both the manufacturing cost and the manufacturing steps are increased, and each of the manufacturing steps becomes more time consuming.

The compensating films, when merely added to the aforementioned display configuration, may often fail to sufficiently blacken the background viewed at a certain oblique angle to the display plane.

SUMMARY OF THE INVENTION

The present invention is made to overcome these disadvantages, and accordingly, it is an object of the present invention to provide a liquid crystal display device of a simplified structure and a widened viewing angle.

According to the present invention, a liquid crystal display device has a stacked structure with its component plates and layers laid one over another in the following top-down order. The liquid crystal display device comprises a first polarizing plate of $\alpha$ in optic-axial angle, a first $\lambda/2$ retardation plate of $\beta$ in the optic-axial angle, a first $\lambda/4$ retardation plate of $\gamma$ in the optic-axial angle, a liquid crystal layer, a second $\lambda/4$ retardation plate, a second $\lambda/2$ retardation plate of $(2\gamma-\beta)$ in the optic-axial angle, and a second polarizing plate of $(\pi/2-\alpha+2\gamma)$ in the optic-axial angle. The liquid crystal layer is located as an interlayer between two of substrates and has opposite major surfaces oriented in vertical directions. The second $\lambda/4$ retardation plate is disposed in phase or in parallel with the first $\lambda/4$ retardation plate (i.e., the optic-axial angle of $\gamma$).

A liquid crystal display device according to the present invention includes two polarizing plates, two $\lambda/2$ retardation plates and two $\lambda/4$ retardation plates. The plates of each pair have respective retardation axes shifted in unique angular relations. Especially, the two $\lambda/4$ retardation plates are disposed in parallel and in phase with each other to reduce a brightness variation for widening a range of a viewing angle.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Referring to the accompanying drawings, embodiments of the present invention will now be described in detail.

Figure 1:
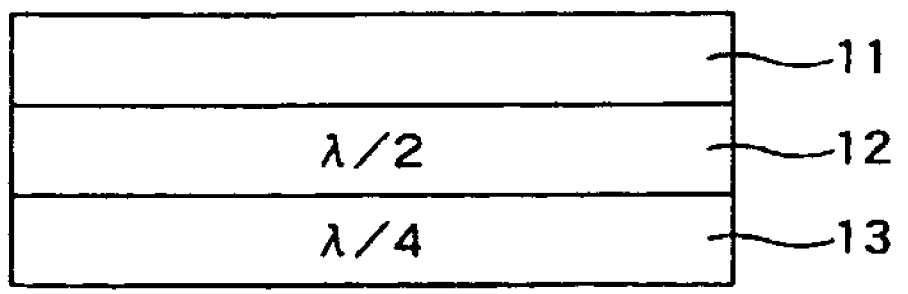
FIG. 1 is a schematic vertical sectional view showing a stacked structure of an exemplary liquid crystal device according to the present invention.
Figure 1:
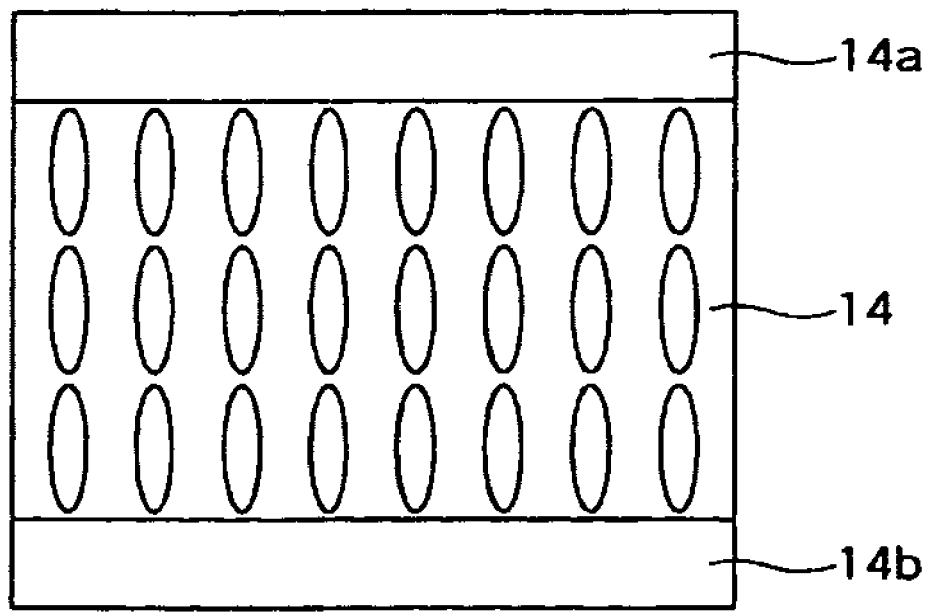
Figure 1:
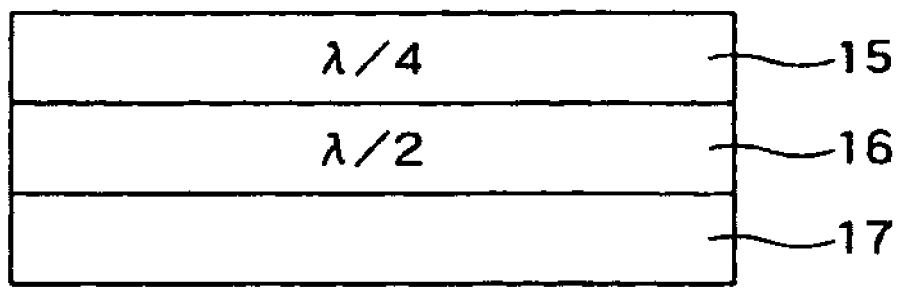

FIG. 1 is a sectional view showing a stacked structure of an embodiment of a liquid crystal device according to the present invention, and especially hereinafter, a transmissive liquid crystal display device of the same type as in the above-mentioned prior art embodiment will be exemplified.

As can be seen in FIG. 1, similar to the above-mentioned prior art embodiment, the liquid crystal device according to the present invention has a stacked structure with a first polarizing plate 11, a first λ/2 retardation plate 12, a first λ/4 retardation plate 13, a liquid crystal layer 14, a second λ/4 retardation plate 15, a second λ/2 retardation plate 16, and a second polarizing plate 17. The liquid crystal layer 14 has orientating layers 14a and 14b on its opposite major surfaces. The second polarizing plate 17 is laid one over another in the top-down order.

Figure 2:
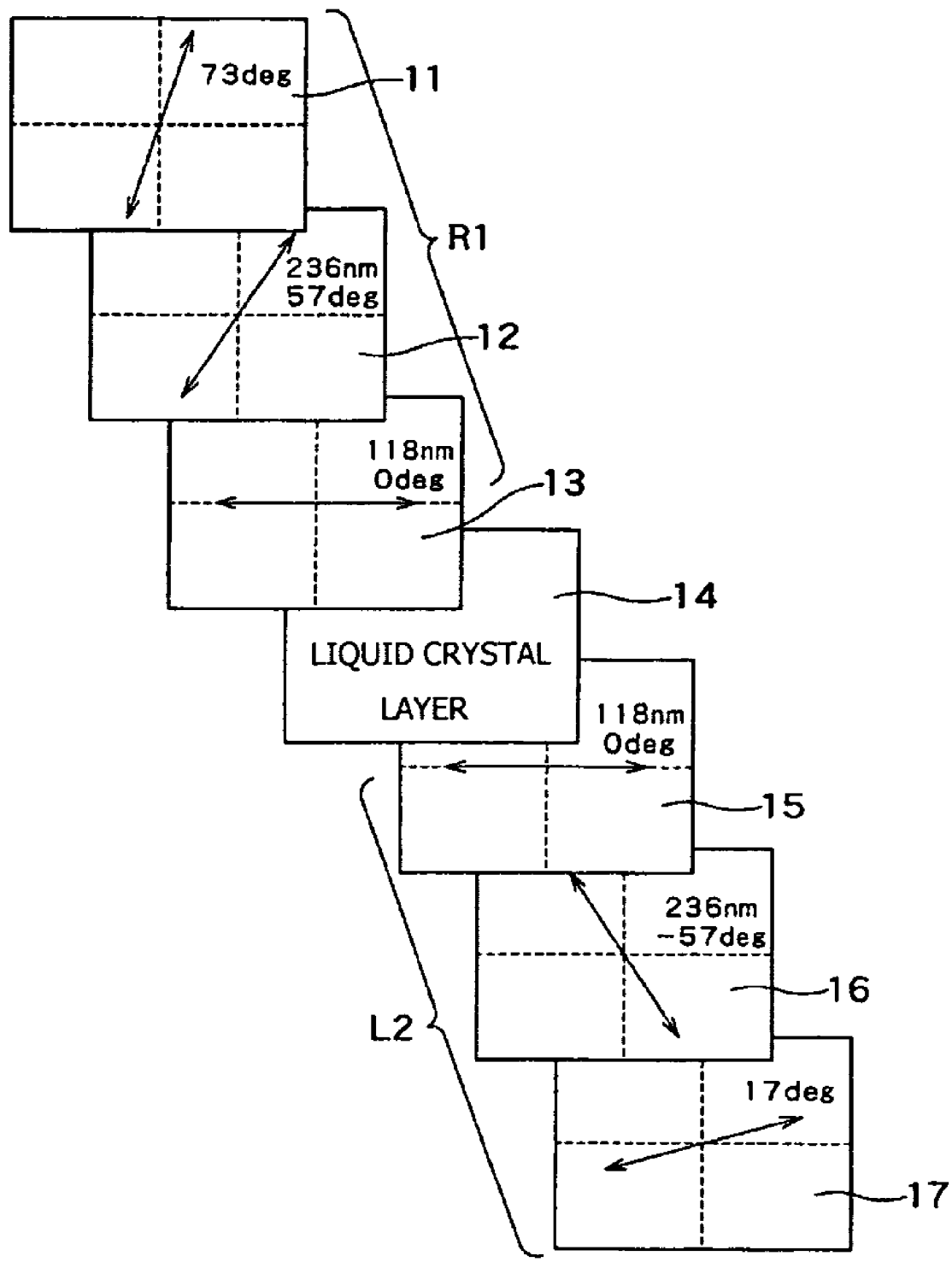
FIG. 2 is a perspective view illustrating details of the stacked structure of a first embodiment of the present invention.

Such a stacked structure will be detailed with reference to FIG. 2. In FIG. 2, retardation axes of the component layers are shifted from one another, and optic-axial angles are set forth.

First, the polarizing plate 11 is positioned and has a retardation axis shifted α=73° out of phase from the horizontal reference axis. Then, the λ/2 retardation plate 12 provides a retardation of 236 nm, and has a retardation axis shifted β=57° out of phase. Further, the λ/4 retardation plate 13 provides the retardation of 118 nm, and has a retardation axis fixed in phase or in parallel with the horizontal reference axis (i.e., both the axes meet at the angle of γ=0°). These plates all assume a dextrorotatory circular polarization pattern referred to as "R1" pattern hereinafter.

A stacked structure laid under the liquid crystal layer is similar to that laid above it, but they have several distinguishing features. For instance, the underlying stacked structure includes a second λ/4 retardation plate 15, a second λ/2 retardation plate 16 and a second polarization plate 17. The second λ/4 retardation plate 15 provides the retardation of 118 nm and has a retardation axis positioned in phase or in parallel with the horizontal reference axis (i.e., at the angle zero). The second λ/2 retardation plate 16 is laid under the plate 15 and provides the retardation of 236 nm, and the second λ/2 retardation plate 16 also has a retardation axis shifted −57° out of phase from the reference axis and the retardation axis is reverse to the shift direction of the first λ/2 retardation plate 12. The second polarization plate 17 is laid further under 17° out of phase from the horizontal reference axis. These plates all assume a laevorotatory circular polarization and are classified in a group referred to as "L2" pattern since the retardation angle of the λ/2 retardation plate to its counterpart in R1 is in a conjugate relation.

Now the detailed explanation of the retardation plates is given. They are fabricated by pulling film of polycarbonate resin or Norbornene (a micaceous substance) in a specific direction(s) to a predetermined thickness such as 43 micrometers.

In this embodiment, two of the λ/4 retardation plates are in phase without angular difference between their respective retardation axes, and no compensating films are provided unlike the conventional case. In addition, two of the λ/2 retardation plates are conjugate to each other, and the sum of the angles of the retardation axes of two of the polarizing plates can be expressed as π/2 (i.e., 90°).

Besides, in this embodiment, the optic-axial angle γ of the first λ/4 retardation plate 13 is zero. If in the case of this angle γ is other than zero, the optic-axial angles of the component plates to the reference axis can be generalized as follows: the retardation axis of the second λ/4 retardation plate 15 is shifted from the reference axis by the angle γ, the one of the second λ/2 retardation plate 16 is shifted by the angle 2γ−β, and the one of the second polarization plate 17 is shifted by the angle π/2−α+2β.

Figure 3:
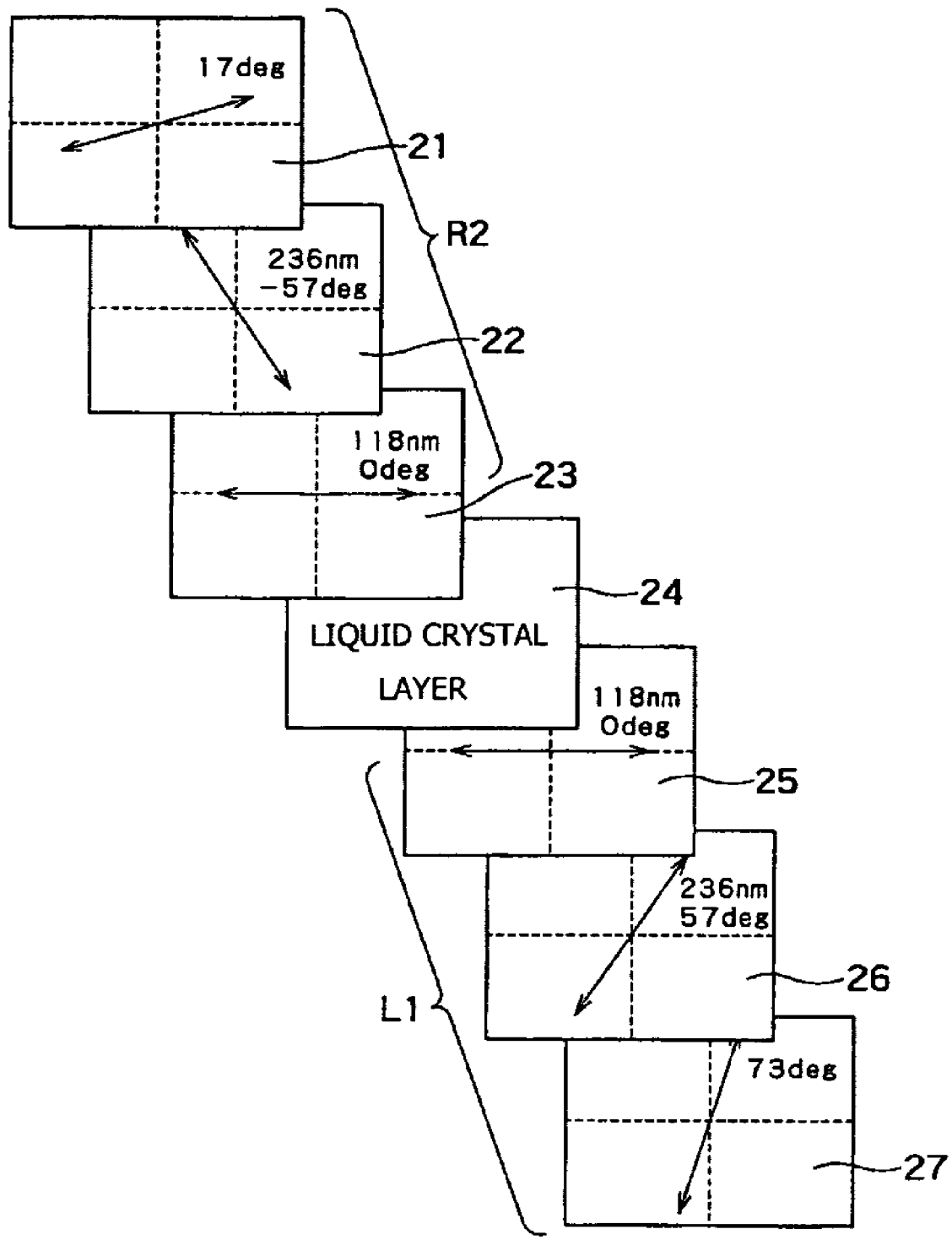
FIG. 3 is a perspective view illustrating details of the stacked structure of a second embodiment of the present invention.

Referring now to FIG. 3, a second embodiment of the liquid crystal display device according to the present invention is depicted in a stacked structure similar to that in FIG. 2.

A first polarizing plate 21 is positioned and has a retardation axis shifted α=17° of phase from the horizontal reference axis. Thus, the optic-axial angle of a second polarization plate 27 opposite to the first polarizing plate 21 is 73° (i.e., 90°−17°).

A λ/2 retardation plate 22 provides the retardation of 236 nm, and has a retardation axis β=−57° out of phase from the reference axis. A λ/4 retardation plate 23 laid over it provides the retardation of 118 nm, and has a retardation axis in phase or in parallel with the horizontal reference axis (i.e., γ=0). Although these plates all assume the dextrorotatory circular polarization pattern, some are shifted by varied angles from those given in the first embodiment, and the unique circular polarization pattern is referred to as "R2" pattern.

In addition to the stacked structure laid above a liquid crystal layer 24, another stacked structure similar to the overlying one is laid under the liquid crystal layer, and both the stacked structures are distinguished in some points. Specifically, the underlying stacked structure includes a second λ/4 retardation plate 25, a second λ/2 retardation plate 26 and a second polarization plate 27. The second λ/4 retardation plate 25 provides the retardation of 118 nm and has a retardation axis fixed in phase or in parallel with the horizontal reference axis (i.e., at the angle zero). The second λ/2 retardation plate 26 is laid under the plate 25, and has a retardation axis shifted 57° out of phase from the horizontal reference axis, and it provides the retardation of 236 nm. The second polarization plate 27 is laid further under 73° out of phase from the horizontal reference axis as mentioned above. These plates all assume a laevorotatory circular polarization and are also classified in a group referred to as "L2" pattern since the retardation angle of the λ/2 retardation plate to its counterpart in R1 is in a conjugate relation.

In this embodiment, two of the λ/4 retardation plates are in phase without angular difference between their respective retardation axes, and no compensating films are provided unlike the conventional case. In addition, two of the λ/2 retardation plates are conjugate to each other, and the sum of the optic-axial angles of two of the polarizing plates can be expressed as π/2 (i.e., 90°).

In either the combination of R1 and L1, or R2 and L2, both the pairs of the polarization plates and the λ/2 retardation plates are conjugate to each other.

The relations of one of the pairs of plates to its counterpart can be similarly obtained as in the first embodiment in terms of the generalized optic-axial angles.

Although the optic-axial angles γ of the λ/4 retardation plates to the reference axis is 0° in the above-stated embodiment, this is because such settings are suitable to a longitudinally elongated screen used in a mobile phone and other electronic devices. Thus, in the case of applying to a laterally elongated screen, it is desirable to have the angle γ of 90°.

Figure 4:
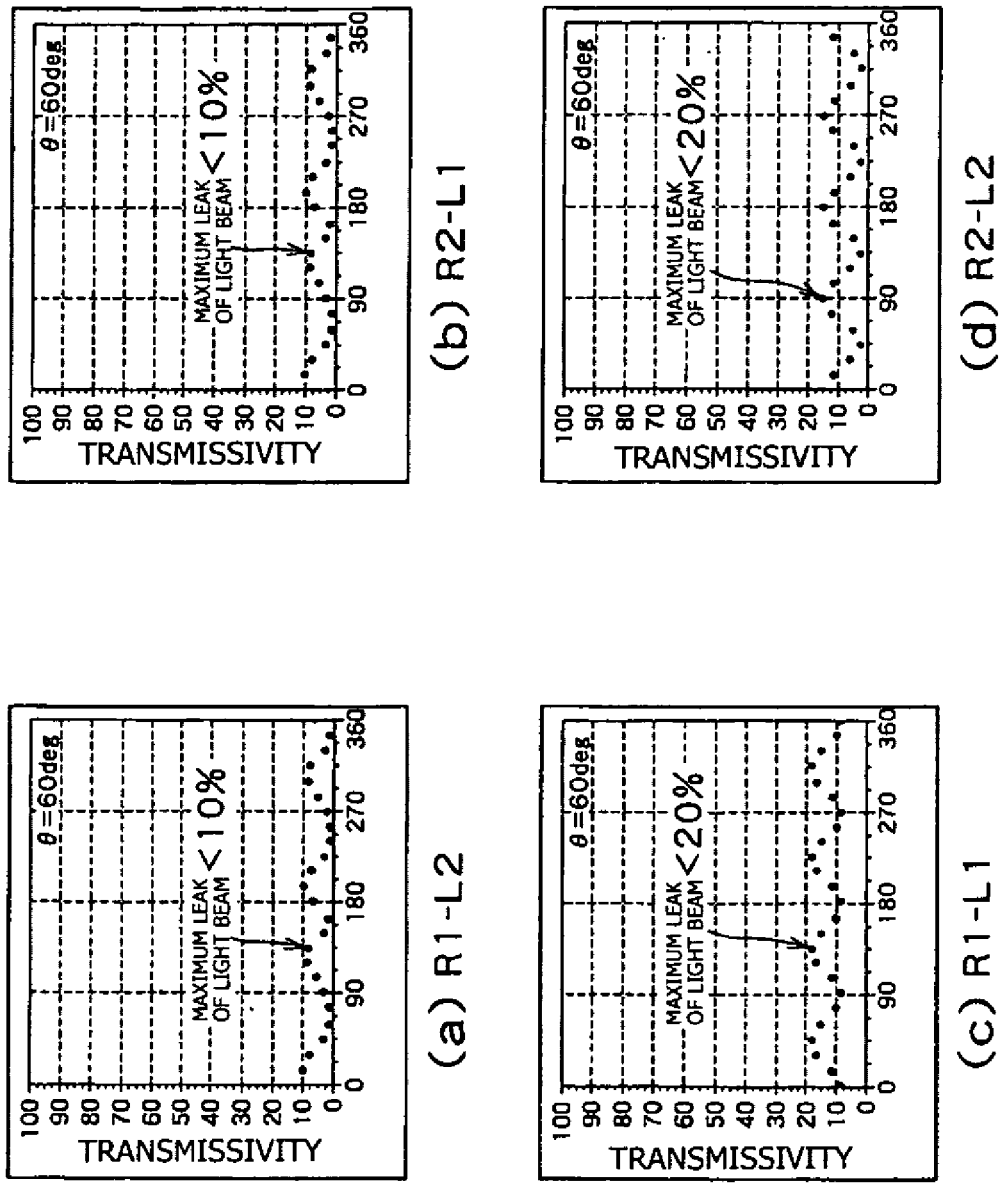
FIG. 4 is a graph showing effects of the first and second embodiments in comparison with those of a sample embodiment.

FIG. 4 is a graph showing effects of the first and second embodiments, and especially depicting a varied black luminance under the conditions of 60° fixed viewing angle and 360° cycling azimuthal angle.

The graph in FIG. 4(a) relates to a combination structure of R1 and L2 in the first embodiment, and the graph in FIG. 4(b) relates to a combination structure of R2 and L1 in the second embodiment. The maximum leak ratio of light beam does not exceed 10%. The combined components in the structure may be completely swapped over in position to attain the same results.

The graph in FIG. 4(c) relates to a combination structure of R1 and L1, and FIG. 4(d) relates to a combination structure of R2 and L2. These graphs are shown as samples for comparing with one another. In these sample structures, the retardation plate in one of the patterns is conjugate to its counterpart in the other pattern, and hence, their arrangement is the same as in the conventional case described in conjunction with FIG. 1.

From the graphs in FIGS. 4(c) and 4(d), it was found that the maximum leak of light beam reaches as high as 20%, and hence, the application of the present invention reduces the dependency of the display performance on the viewing angle.

Consequently, the compensation films are no longer required, and a liquid crystal display device, having a satisfactory allowable viewing angle, is obtained by the stacked structure simply with the conventional retardation plates (retardation films).

Figure 5:
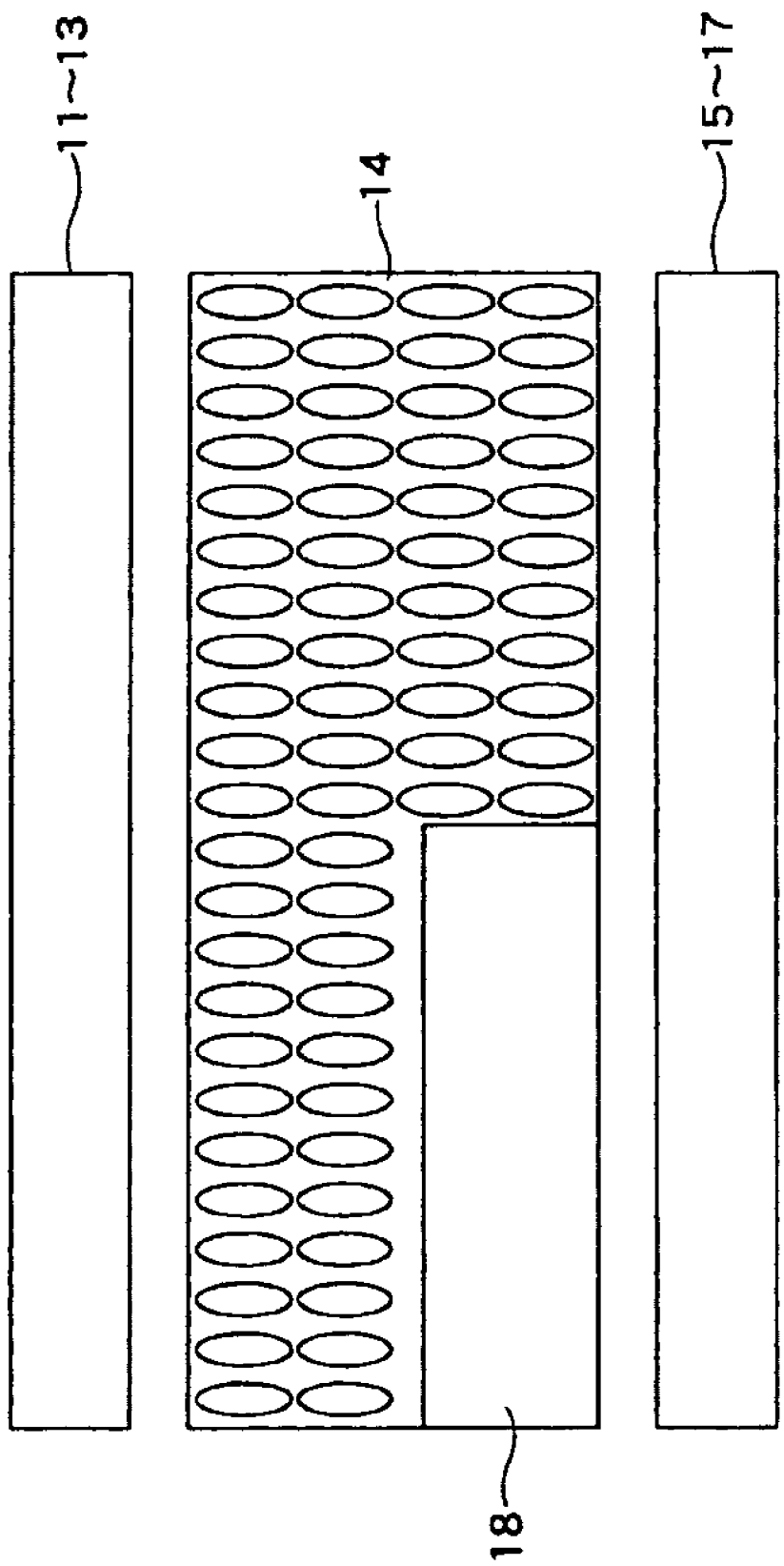
FIG. 5 is a schematic vertical sectional view outlining a structure of another embodiment of the liquid crystal display device according to the present invention.
Figure 6:
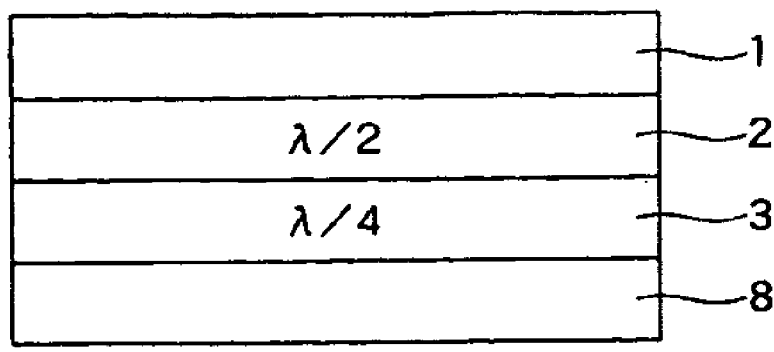
FIG. 6 is a schematic vertical sectional view outlining a stacked structure of a conventional liquid crystal display device.
Figure 6:
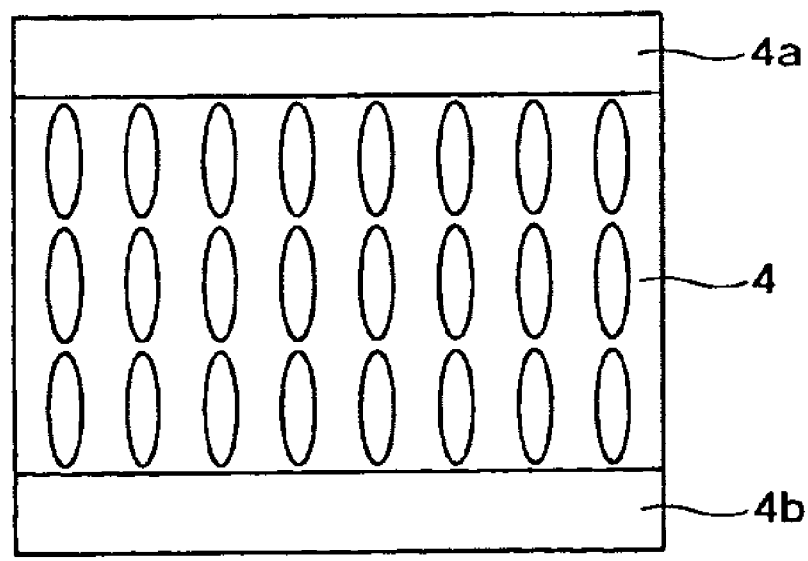
Figure 6:
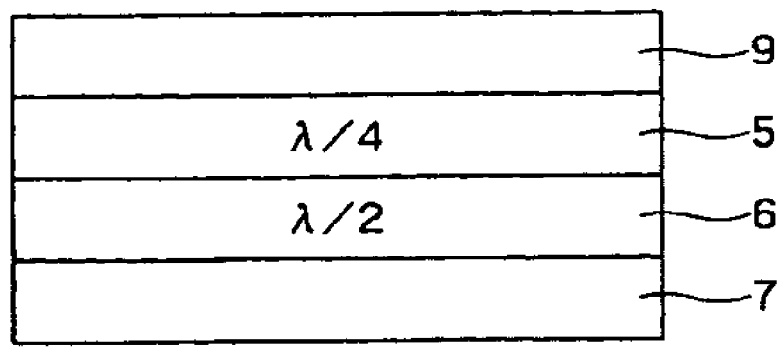

FIG. 5 is a schematic sectional view showing another embodiment of the liquid crystal display device according to the present invention. A transmissive portion and a reflective portion are disposed within the same liquid crystal display device. In the liquid crystal display device set forth herein, a predetermined thickness of the reflective portion in the liquid crystal layer may be about a half the thickness of the transmissive portion because a reflection film 18 is provided in the corresponding position.

In this embodiment, the aforementioned structures detailed with reference to FIGS. 2 and 3 can be applied especially to the transmissive portion so as to obtain the liquid crystal display device of the reduced dependency on the viewing angle.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A liquid crystal display device that has a stacked structure with its component plates and layers laid one over another in the following top-down order, comprising a first polarizing plate of $\alpha$ in optic-axial angle, a first $\lambda/2$ retardation plate of $\beta$ in the optic-axial angle, a first $\lambda/4$ retardation plate of $\gamma$ in the optic-axial angle, a liquid crystal layer located as an interlayer between two of substrates and having its opposite major surfaces oriented in vertical directions, a second $\lambda/4$ retardation plate disposed in phase or in parallel with the first $\lambda/4$ retardation plate (i.e., the optic-axial angle of $\gamma$), a second $\lambda/2$ retardation plate of $(2\gamma-\beta)$ in the optic-axial angle, and a second polarizing plate of $(\pi/2-\alpha+2\gamma)$ in the optic-axial angle.

2. The liquid crystal display device according to claim 1, wherein a retardation of each of the $\lambda/2$ retardation plates is twice as great as the retardation of each of the $\lambda/4$ retardation plates.

3. The liquid crystal display device according to claim 1, wherein the optic-axial angle $\gamma$ is 0 degree in an application to a longitudinally elongated screen.

4. The liquid crystal display device according to claim 1, wherein the optic-axial angle $\beta$ is 57±5 degrees.

5. The liquid crystal display device according to claim 1 wherein the liquid crystal layer comprises a reflective portion of a predetermined thickness, and a transparent potion of twice the predetermined thickness.

6. The liquid crystal display device according to claim 1, wherein the optic-axial angle $\gamma$ is 0 or 90 degree in reference to a longitudinally elongated screen.

* * * * *